Feb. 15, 1944.   L. B. STINSON   2,341,670
PIPE AND TOOL JOINT CONNECTION
Filed Jan. 17, 1942

Leon B. Stinson
INVENTOR
BY Jesse R. Stone

Patented Feb. 15, 1944

2,341,670

UNITED STATES PATENT OFFICE 2,341,670

PIPE AND TOOL JOINT CONNECTION

Leon B. Stinson, Oklahoma City, Okla., assignor to Hughes Tool Company, Houston, Tex., a corporation of Delaware Application January 17, 1942, Serial No. 427,087

3 Claims. (Cl. 285—146)

My invention relates to the construction of a connection between a tapered pipe end and the socket of a tool joint.

In securing a tool joint to the end of a drill pipe section care must be taken to provide a tight seal so that no fluid can leak past the same. It is also necessary that the last engaged thread be protected against fatigue and failure due to strains placed upon it resulting from bending, torque and vibration in use. Many different expedients have been adopted to accomplish these objects, some of which are unavailing and some of which are difficult or expensive to operate.

It is an object of this invention to provide a connecting device which can be easily engaged and in which the thread itself is replaceable.

It is also an object to provide a threaded connection wherein the thread may be made particularly wear resistant.

I further aim to provide a threaded connection which will operate successfully and which automatically will accommodate such error in lead as may result from ordinary manufacturing processes.

I also desire to provide a tight sealing engagement on both ends of the threaded area.

Further objects and advantages will become apparent from the description which follows together with the drawing, in which Fig. 1 is a side view partly in vertical section showing a pipe end engaged within the socket of a tool joint.

Figure 1:
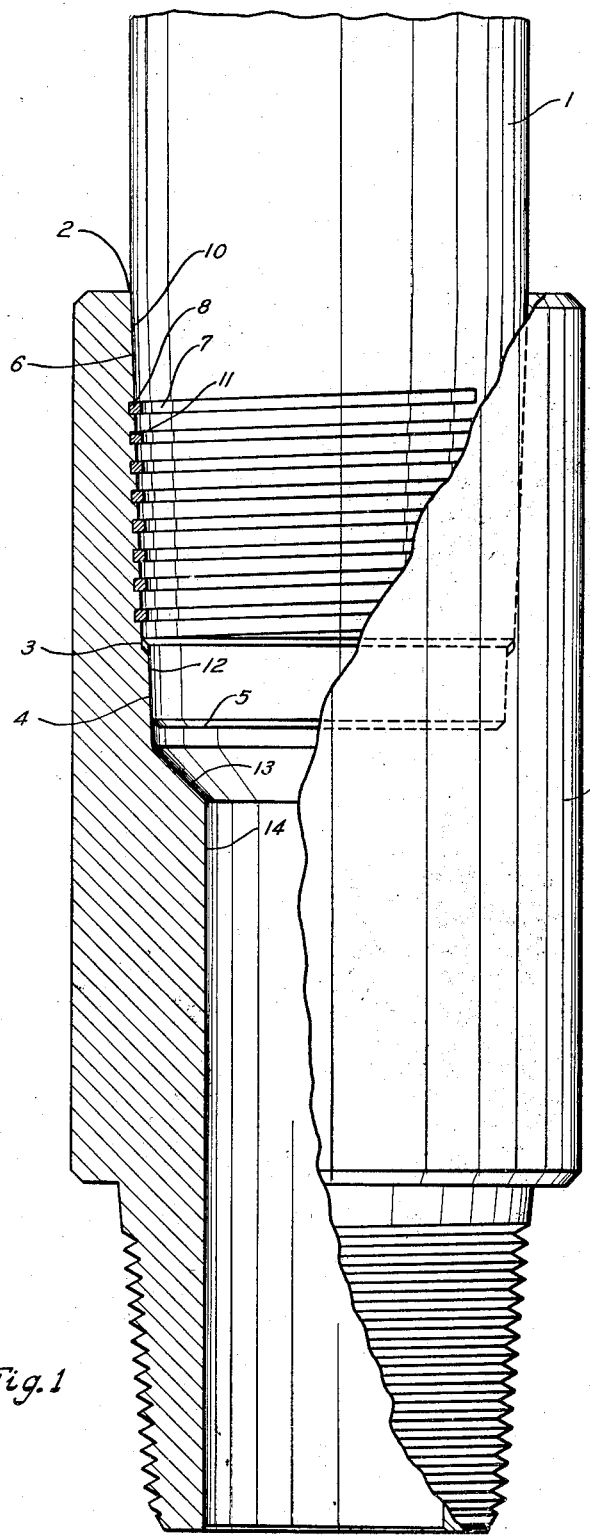

The invention is concerned particularly with forming a thread upon the mating ends of the pipe and the tool joint member. The pipe 1 is formed cylindrical except at the end where it engages the tool joint socket. There it is tapered slightly beginning at 2 and extending to the end of the threaded area shown at 3. Beyond the threaded area the inner diameter is reduced slightly and a smooth unthreaded area 4 is provided which forms a sealing area. The extreme end of the pipe member is beveled off at 5.

The tapered portion is smooth for a short distance at 6 and beyond this smooth sealing area the pipe is provided with a spiral groove 7 to receive the spring threads 8 which form the connecting member.

The tool joint 9 is formed with a socket tapered and grooved to mate with the pipe end. The socket has a smooth area 10 to mate with the smooth area 6 upon the pipe and grooves 11 in the socket are formed to receive the spiral spring thread 8. The socket is also reduced in diameter at 12 and formed with a smooth surface to engage the sealing area 4 upon the pipe. Below this tapered area the socket is tapered at 13 down to the wall of the passage 14 through the joint member.

The spring 8 which forms the thread which secures the two parts together is preferably square in cross section and of a length to fit within the spiral threaded portions of the two mating members. At the outer end of the spring member 8, I form a projecting finger 15 which is adapted to engage within a recess in the end of the thread-receiving groove of the tool joint socket.

Figure 2:
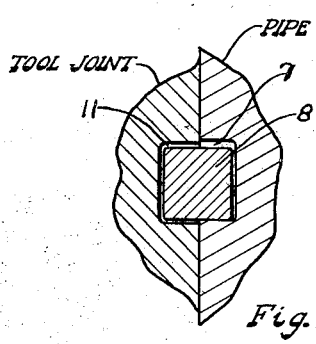
Fig. 2 is a broken section through a thread embodying the invention and in which the tool joint is loosely made up.
Figure 3:
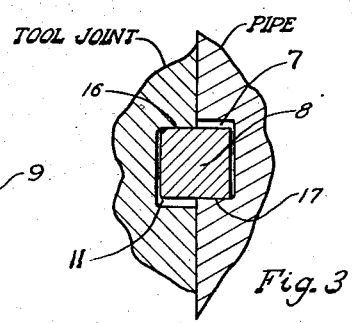
Fig. 3 is a similar view showing the connection tightly engaged.
Figure 4:
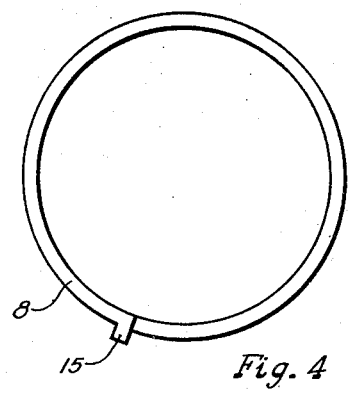
Fig. 4 is a top plan view of the upper coil of the spring thread.

In the operation of fitting the pipe and tool joint in sealing relation it is contemplated that the tool joint socket will be heated up to a temperature sufficient to slightly enlarge the inner diameter of the socket. The spring member is then inserted within the socket, the finger 15 fitting within a recess in the tool joint and the remainder of the spring lying within the spiral groove in the socket. The pipe is then screwed within the socket as tightly as may be done readily by hand. This position of the parts is shown in Fig. 2 where the spring 8 engages loosely in the groove 7 in the pipe end and the groove 11 in the tool joint socket. A wrench is then employed to tighten the tool joint upon the pipe until the parts assume the position shown in Fig. 3 in which there is a tight engagement between the thread member 8 and the end walls of the groove as there indicated, there being a tight engagement between the end wall 16 of the groove 11 of the tool joint and the outer surface of the spring 8, and a similar engagement at 17 between the spring 8 and the inner wall of the groove 7.

As the tool joint shrinks it will bring the sealing areas 10 and 12 on the socket into tight engagement with the opposing areas upon the pipe and an extremely close sealing effect will thus be obtained.

It will be noted that by forming the thread in this manner the thread may be made of much harder material than is the tool joint or the pipe and will thus be able to withstand a material amount of wear in use and will not easily gall, Furthermore, this thread may be removed and replaced when desired without the necessity of renewing any of the other parts. The provision of the finger upon the larger end of the spring which forms the thread prevents the spring from creeping in the groove in the socket when the parts are being screwed together. Thus the spring will not be allowed to wind up and change its position in the groove and thus tend to bind therein.

This type of joint may be connected together with ordinary apparatus which may be easily handled in the field so that tool joints may be secured upon the pipe or removed therefrom without the necessity of heavy apparatus such as is now sometimes employed. As the spring thread member has a longitudinal play in the grooves, longitudinal strain upon the threads will not injure or gall the same due to normal errors in lead in forming the grooves.

What is claimed is:

1. A tool joint and drill pipe engaging device including a tapered surface formed upon the end of said pipe, a spiral groove formed between the ends of said tapered surface and stopping short of each end thereof, sealing surfaces at each end of said grooved area, a pipe-receiving socket formed in said tool joint, a spiral groove formed therein to register with the groove in said pipe end, a spiral spring thread fitting in said grooves and adapted to secure said pipe and tool joint against relative longitudinal movement, and sealing areas on said socket engaging the sealing surfaces upon said pipe said sealing areas being shrunk together.

2. In a tool joint and pipe connection, tapered areas on said pipe and said joint, registering spiral rectangular grooves on said areas, sealing surfaces at each end of the grooves on said tapered areas, and a spiral spring member rectangular in cross section fitting within said grooves and serving as a thread to secure said tool joint and pipe together, said grooves being slightly wider than said spring whereby said spring fits loosely therein, whereby provision is made for longitudinal shrinking when said joint is shrunk upon said pipe.

3. In a tool joint and pipe connection, tapered areas on said pipe and said joint, registering spiral grooves rectangular in cross section on said areas, sealing surfaces at each end of the grooves on both pipe and joint, and a spiral spring member of hard metal fitting within said grooves and serving as a thread to secure said tool joint and pipe together, said grooves being slightly wider than said spring so that when the joint is screwed tightly on said pipe, movement of said joint and pipe away from each other is prevented but slight movement of said pipe into said joint is permitted.

LEON B. STINSON.